United States Patent [19]
Kobayashi

[11] Patent Number: 5,692,696
[45] Date of Patent: Dec. 2, 1997

[54] RECORDING AND/OR REPRODUCING APPARATUS HAVING REEL MOUNTS AND REELS MOUNT COVER

[75] Inventor: Junji Kobayashi, Tokyo, Japan

[73] Assignee: Canon Kabushiki Kaisha, Tokyo, Japan

[21] Appl. No.: 645,444

[22] Filed: May 13, 1996

[30] Foreign Application Priority Data

| May 31, 1995 | [JP] | Japan | 7-134029 |
| Apr. 5, 1996 | [JP] | Japan | 8-083915 |

[51] Int. Cl.$^6$ .................................................. G11B 15/05
[52] U.S. Cl. ........................................... 242/344; 360/74.6
[58] Field of Search ............................ 242/338, 338.4, 242/339, 344, 352.1, 357, 358, 358.1; 360/74.6, 85, 95, 96.5

[56] References Cited

U.S. PATENT DOCUMENTS 3,925,817  12/1975  Althuber et al. ............... 360/74.6
5,365,383  11/1994  Miller et al. .................... 360/74.6
5,523,905  6/1996  Matsuoka et al. ............... 360/74.6

FOREIGN PATENT DOCUMENTS 600 479  6/1978  Switzerland ................... 360/74.6

*Primary Examiner*—John P. Darling
*Attorney, Agent, or Firm*—Robin, Blecker, Daley and Driscoll

[57] ABSTRACT

In a recording and/or reproducing apparatus which comprises reel mounts which are disposed on a chassis so that they can respectively engage with tape reels, a reel mount cover secured to the chassis to cover a reel mount driving part for driving the reel mounts, and a tape end detecting element disposed on the reel mount cover, contact portions for providing a connection between a wiring extending from the tape end detecting element on the reel mount cover and a wiring provided on the chassis are provided between the surfaces of abutment between the reel mount cover and the chassis, and the reel mount cover is fixed to the chassis by fastening the surfaces of abutment in a portion between the contact portions and an abutment start portion positioned in the vicinity of the contact portions.

23 Claims, 6 Drawing Sheets

RECORDING AND/OR REPRODUCING APPARATUS HAVING REEL MOUNTS AND REELS MOUNT COVER

BACKGROUND OF THE INVENTION

1. Field of the Invention

The present invention relates to a recording and/or reproducing apparatus, such as a VTR, in which a tape end detecting element is disposed on a reel mount cover.

2. Description of the Related Art

FIGS. 5 and 6 show a VTR having a system in which a tape cassette inserted in the VTR is moved to approach a rotary drum. As shown, the VTR includes a main chassis 1 which is a first chassis, and a slide chassis 2 which is a second chassis, and the slide chassis 2 is arranged for sliding movement on the main chassis 1. The VTR also includes a rotary drum 3 disposed on the main chassis 1 and provided with a plurality of recording or reproducing magnetic heads. The VTR also includes a capstan 4 projecting from the main chassis 1, tape guide members 5 and 6 which constitute tape loading means, and a pair of reel mounts 7 and 8 disposed on the slide chassis 2. A tape cassette 9 contains a pair of reels 11 and 12 around which a magnetic tape 10 is wound.

In the above-described VTR, as shown in FIG. 5, when the tape cassette 9 is set on the slide chassis 2, both reels 11 and 12 are respectively brought into engagement with the reel mounts 7 and 8. Then, the slide chassis 2 is made to relatively slide toward the rotary drum 3 with respect to the main chassis 1, and the magnetic tape 10 is drawn from the tape cassette 9 through an opening 9a by the tape guide members 5 and 6. Finally, as shown in FIG. 6, at least part of the rotary drum 3 is relatively inserted into the opening 9a of the tape cassette 9, and the magnetic tape 10 is loaded into a predetermined path which contains the peripheral surface of the rotary drum 3. During this state, the magnetic tape 10 is pressed against the capstan 4 by a pinch roller (not shown), and the magnetic tape 10 is made to run so that desired information is recorded or reproduced by the magnetic heads of the rotary drum 3.

Normally, the VTR is provided with a tape end detecting element for detecting an end of the magnetic tape 10, i.e., a tape end. In the VTR of the aforesaid type in which the slide chassis 2 moves with respect to the main chassis 1, it is general practice to adopt the following arrangement and construction as the installation location and the wiring structure of the tape end detecting element because a reel mount driving part needs to be disposed between both reel mounts 7 and 8 on the slide chassis 2.

Specifically, as shown in FIG. 7, the slide chassis 2 on which the supply reel mount 7 and the take-up reel mount 8 are disposed is arranged for sliding movement with respect to the main chassis 1 on which the rotary drum 3 is disposed, by the engagement between guide pins 1a–1d and guide slots 2a–2d. A drive gear 13 is rotationally driven on the main chassis 1 and an idler gear 14 is made to swing in interlocking relation to the rotation of the drive gear 13 on the slide chassis 2, so that the rotation of the drive gear 13 is selectively transmitted to the supply reel mount 7 and the take-up reel mount 8 via the idler gear 14.

A reel mount cover 15 for covering the idler gear 14 is fixed at its four corners to the slide chassis 2 by fixing screws 16a–16d. A light emitting element 17 for detecting a tape end is disposed on the reel mount cover 15 in a central forward portion thereof. A pair of light receiving elements 18 and 19 which correspond to the light emitting element 17 are disposed on the slide chassis 2, and a flexible, film-like wiring material 20 which is disposed on the reel mount cover 15, i.e., a flexible printed wiring board (hereinafter referred to as the cover FPC 20), is connected at its one end to the light emitting element 17. An FPC 21 which is disposed on the slide chassis 2 (hereinafter referred to as the chassis FPC 21) is connected at its one end (not shown) to a circuit of the VTR. On the slide chassis 2, the other end of the cover FPC 20 is connected to the other end of the chassis FPC 21 by solder 22.

Normally, in the VTR, the installation location of the light emitting element 17 is prescribed by the unified format of the tape cassette 9. In the aforesaid VTR, since the tape cassette 9 is made to move together with the slide chassis 2, the light emitting element 17 needs to be disposed on a moving side. However, since the idler gear 14 is disposed on the slide chassis 2, there is no choice but to dispose the light emitting element 17 on the reel mount cover 15. In addition, the cover FPC 20 for wiring the light emitting element 17 needs to be extended on the reel mount cover 15 so that the cover FPC 20 can be prevented from coming into contact with the idler gear 14 and the like.

For these reasons, the installation location and the wiring structure of the light emitting element 17 are arranged in the above-described manner. However, such a conventional art is difficult to automate, because the step of connecting the wiring of the cover FPC 20 to that of the chassis FPC 21 by the solder 22 is needed in the process of securing the reel mount cover 15 to the slide chassis 2.

SUMMARY OF THE INVENTION

It is, therefore, one object of the present invention to provide a recording and/or reproducing apparatus having a structure which facilitates automation of the step of securing a reel mount cover to a chassis while securely setting the height of the reel mount cover on the chassis and also makes it possible to provide a secure connection between a cover wiring and a chassis wiring.

To achieve the above object, in accordance with one aspect of the present invention, a recording and/or reproducing apparatus employing a cassette which contains a tape wound around a pair of reels comprises a chassis, a pair of reel mounts provided on the chassis, the pair of reel mounts respectively having engagement portions which engage with the pair of reels, a cover disposed between the pair of reel mounts in such a manner as to expose at least the engagement portions of the pair of reel mounts, the cover having at least one abutment portion at which to fix the cover to the chassis, a sensor for detecting an end of the tape, at least part of the sensor being provided on the cover, a first wiring portion provided on the chassis in such a manner that one end of the first wiring portion is disposed at a position opposite to the abutment portion of the cover, and a second wiring portion provided on the cover in such a manner that one end of the second wiring portion is connected to a portion of the sensor and another end of the second wiring portion is disposed between the abutment portion and the one end of the first wiring portion, wherein a projection for connecting the one end of the first wiring portion to the aforesaid other end of the second wiring portion is provided between surfaces of abutment between the chassis and the abutment portion of the cover, and a fixing member for fixing the abutment portion to the chassis is disposed between the projection and an abutment start portion of the abutment portion.

In accordance with another aspect of the present invention, a cover disposed between a pair of reel mounts provided on a chassis of a recording and/or reproducing apparatus comprises a top face plate, at least one fixing portion integrally joined to the top face plate and formed in an L-like shape in cross section, a projection provided on a face of the fixing portion which face comes into abutment with the chassis, and a hole into which to insert a fixing member for fixing the fixing portion to the chassis, the hole being formed between the projection and a corner portion of the fixing portion formed in the L-like shape in cross section.

In accordance with another aspect of the present invention, a recording and/or reproducing apparatus employing a cassette which contains a tape wound around a pair of reels comprises a first chassis, a second chassis relatively movable with respect to the first chassis, a pair of reel mounts provided on the second chassis, the pair of reel mounts respectively having engagement portions which engage with the pair of reels, a cover disposed between the pair of reel mounts in such a manner as to expose at least the engagement portions of the pair of reel mounts, the cover having at least one abutment portion at which to fix the cover to the second chassis, a sensor for detecting an end of the tape, at least part of the sensor being provided on the cover, a first wiring portion provided on the second chassis in such a manner that one end of the first wiring portion is disposed at a position opposite to the abutment portion of the cover, and a second wiring portion provided on the cover in such a manner that one end of the second wiring portion is connected to a portion of the sensor and another end of the second wiring portion is disposed between the abutment portion and the one end of the first wiring portion, wherein a projection for connecting the one end of the first wiring portion to the aforesaid other end of the second wiring portion is provided between surfaces of abutment between the second chassis and the abutment portion of the cover, and a fixing member for fixing the abutment portion to the second chassis is disposed between the projection and an abutment start portion of the abutment portion.

The above and other objects and aspects of the present invention will become apparent from the following detailed description of a preferred embodiment of the present invention, taken in conjunction with the accompanying drawings.

DETAILED DESCRIPTION OF THE PREFERRED EMBODIMENT

Figure 5:
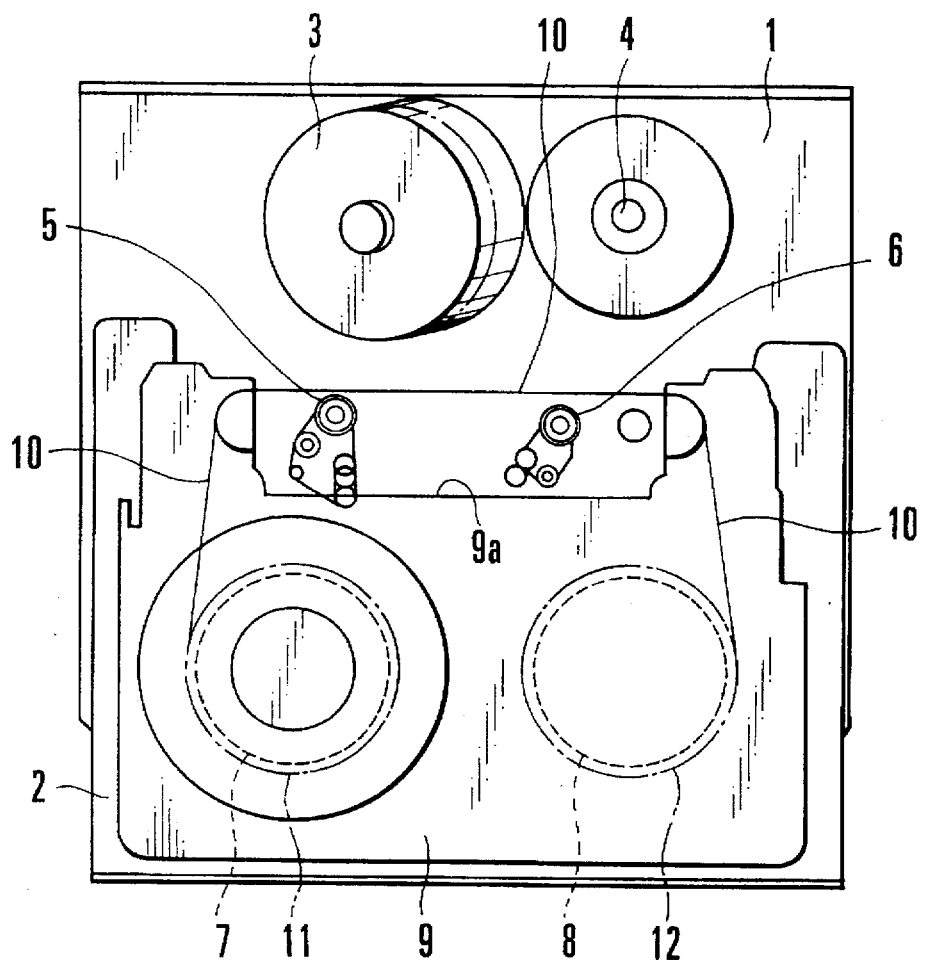
FIG. 5 is a diagrammatic plan view showing an unloaded state of a conventional VTR.
Figure 6:
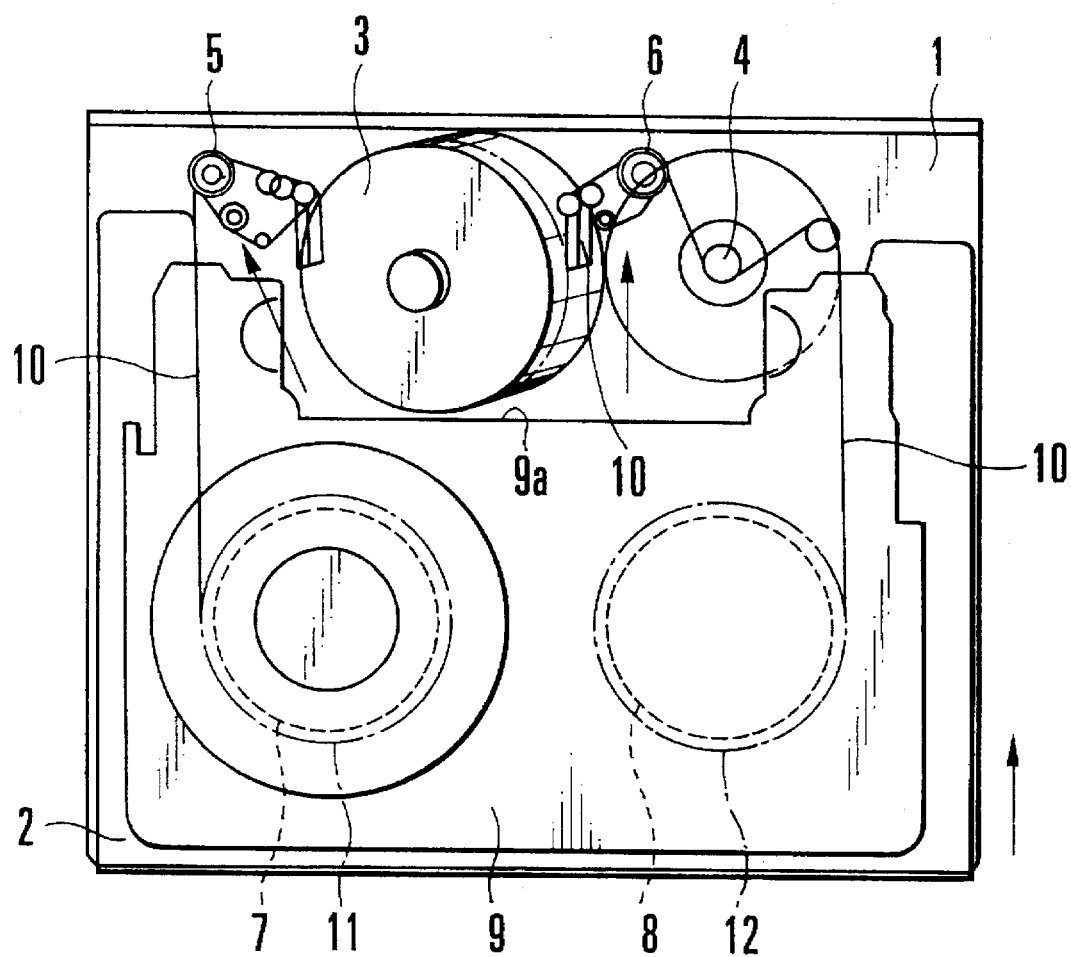
FIG. 6 is a diagrammatic plan view showing a completion-of-loading state of the conventional VTR.
Figure 7:
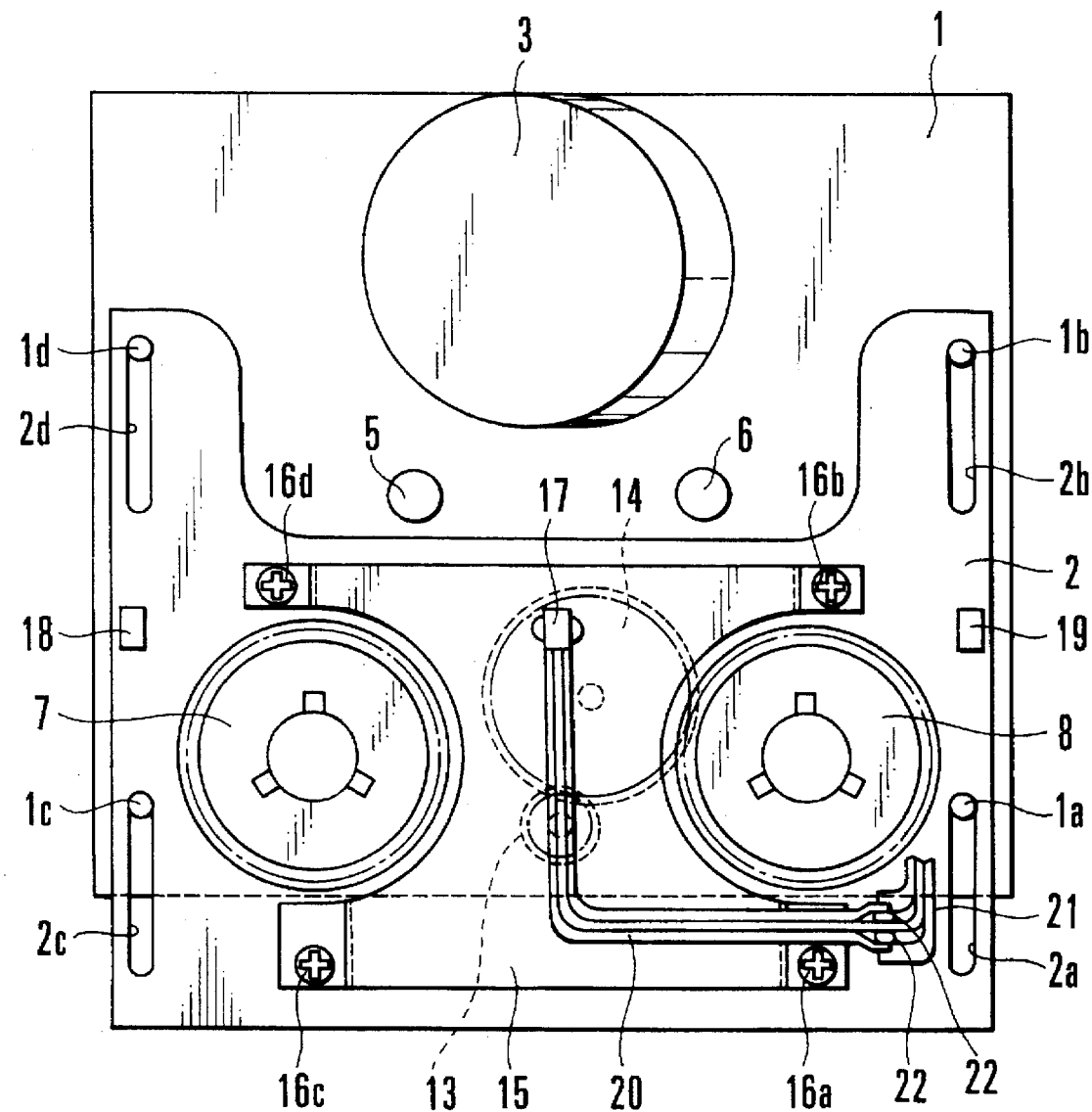
FIG. 7 is a diagrammatic plan view showing the mounting structure of a reel mount cover and the wiring connecting structure of a tape end detecting element in the conventional VTR.

A preferred embodiment of the present invention will be described below with reference to FIGS. 1 to 4. In the following description of the present embodiment, identical reference numerals are used to denote constituent elements which are substantially identical to those used in the example described above with reference to FIG. 7, and the description thereof is omitted for the sake of simplicity. The entire arrangement of a VTR according to the present embodiment may be substantially identical to that of the example described above with reference to FIGS. 5 and 6.

Figure 1:
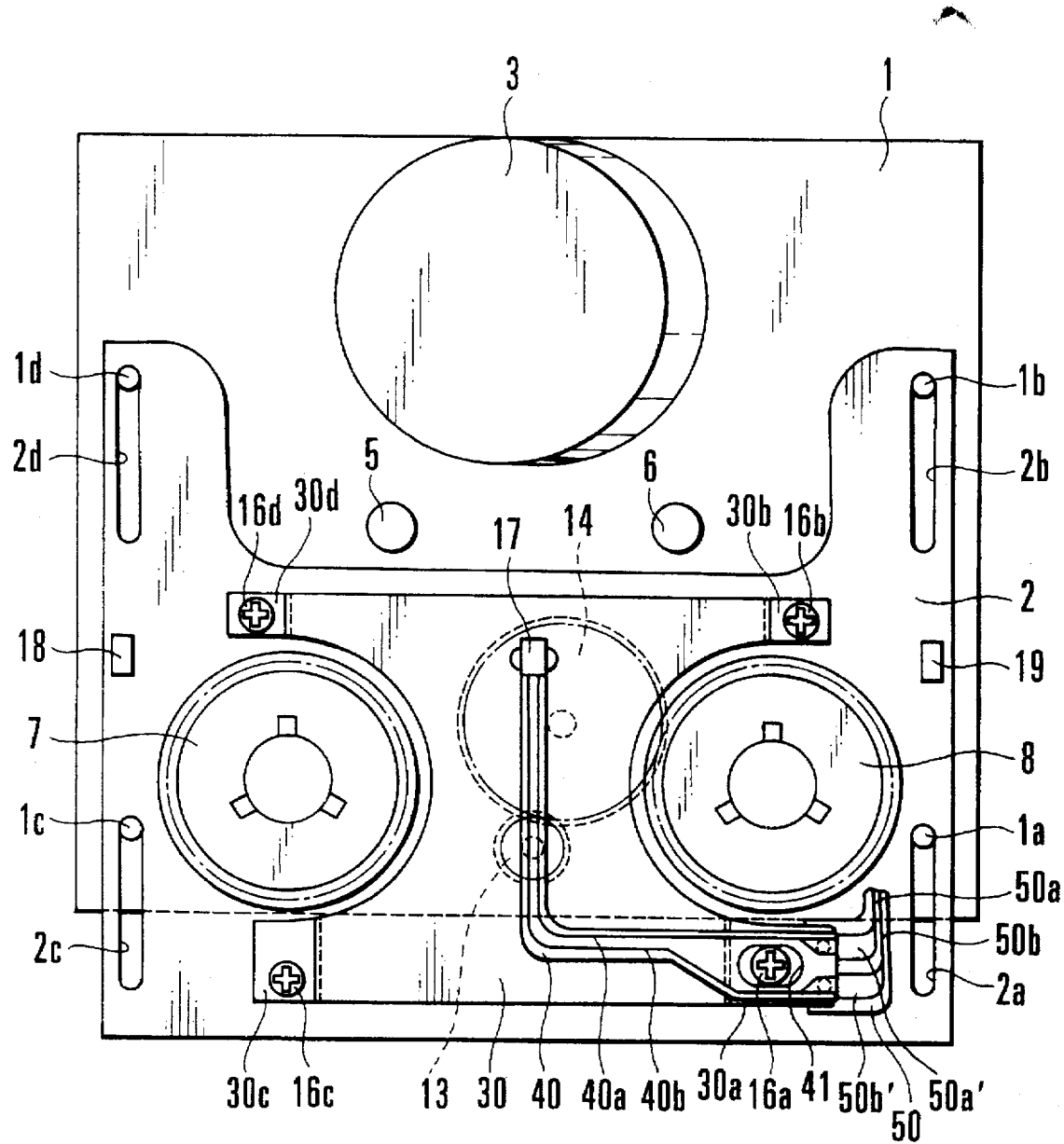
FIG. 1 is a diagrammatic plan view showing the mounting structure of a reel mount cover and the wiring connecting structure of a tape end detecting element in one embodiment in which the present invention is applied to a VTR.
Figure 2:
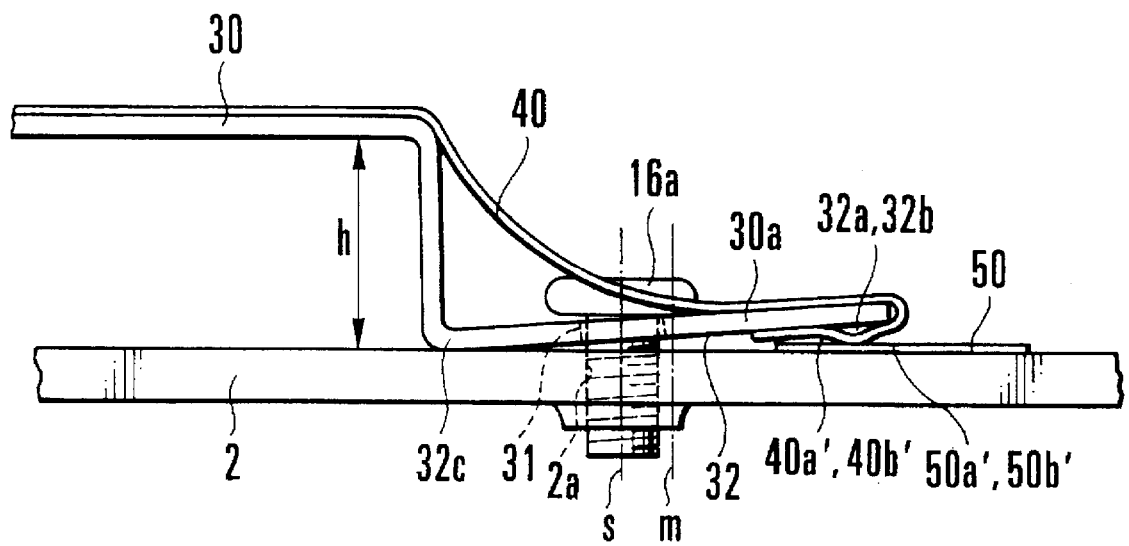
FIGS. 2 and 2A are side views of the essential portions of the embodiment.
Figure 3:
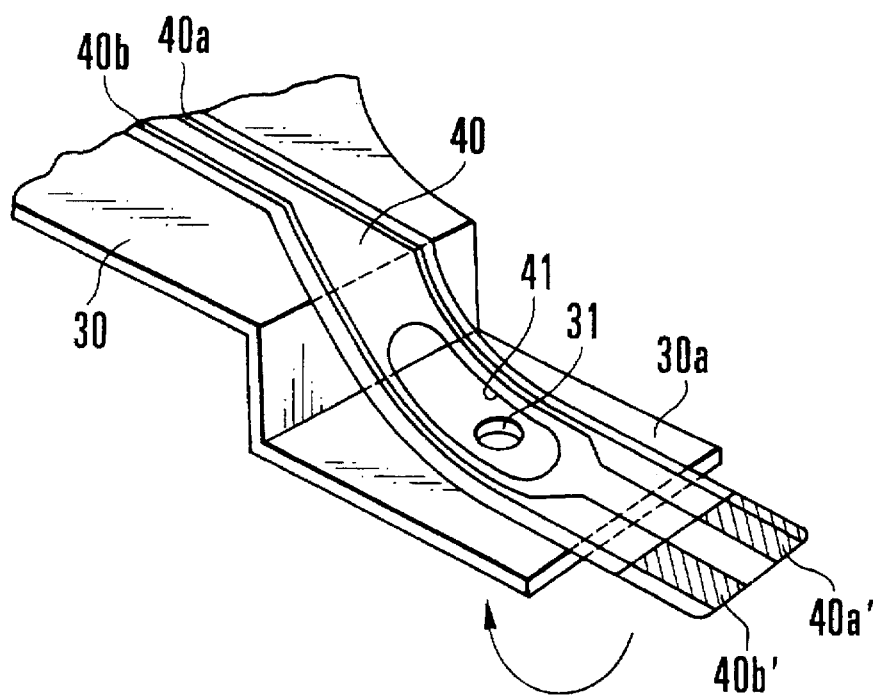
FIG. 3 is a perspective view of the top side of the essential portion of the embodiment.
Figure 4:
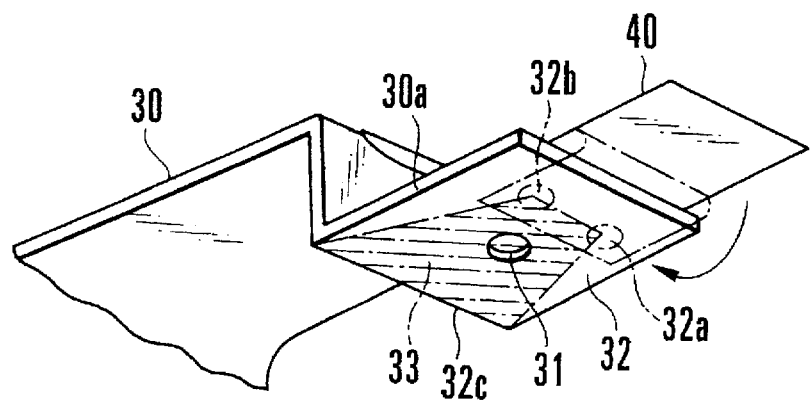
FIG. 4 is a perspective view of the bottom side of the essential portion of the embodiment.

Referring to FIG. 1, a light emitting element 17 is disposed on a reel mount cover 30 for covering the idler gear 14, and the reel mount cover 30 is fixed to a slide chassis 2 at four corner mounting portions 30a to 30d by fixing screws 16a to 16d. As shown in FIGS. 2 to 4, the mounting portion 30a of the reel mount cover 30 is bent in an approximately L-like shape in cross section, and a screw inserting hole 31 is provided in the mounting portion 30a. The other mounting portions 30b to 30d are also similar to the mounting portion 30a. A pair of projections 32a and 32b are provided in the vicinity of the extending end of an abutment face 32 which is the reverse face of the mounting portion 30a. As shown in FIG. 4, the screw inserting hole 31 is provided in an area 33 having the shape of the figure defined by the projections 32a and 32b and an abutment start portion 32c which is the bending edge portion of the abutment face 32.

The screw inserting hole 31 will be described below in more detail. As shown in FIG. 2, the screw inserting hole 31 is formed in such a manner that its center S is offset from a middle point "m" between the abutment start portion 32c and the projections 32a and 32b toward the abutment start portion 32c in the longitudinal direction of the mounting portion 30a (in the horizontal direction as viewed in FIG. 2). According to this arrangement, it is possible to accurately set a height "h" of the reel mount cover 30 as will be described later. In this arrangement, it is to be noted that each of the projections 32a and 32b is formed at a position which is offset toward the extending end of the mounting portion 30a from the position at which the screw inserting hole 31 is formed. In addition, it is to be noted that it is effective to form each of the projections 32a and 32b at a position which is away from the abutment start portion 32c by a distance of not less than twice the distance between the abutment start portion 32c and the center S of the screw inserting hole 31.

Referring back to FIG. 1, an FPC 40 which is bonded to the reel mount cover 30 (hereinafter referred to the cover FPC 40) has wiring patterns 40a and 40b, and the wiring patterns 40a and 40b are connected to the light emitting element 17 at one end of the cover FPC 40. As shown in FIGS. 2 to 4, the other widened end of the cover FPC 40 is folded back to the abutment face 32 at the extending end of the mounting portion 30a of the reel mount cover 30, and is bonded to both obverse and reverse faces of the mounting portion 30a. Each of the wiring patterns 40a and 40b has a widened end portion at the other end of the cover FPC 40, and the extending ends of the respective wiring patterns 40a and 40b are formed as exposed portions (electrical conducting portions) 40a' and 40b' which correspond to the projections 32a and 32b of the abutment face 32, respectively. As shown in FIG. 3, an escape hole 41 the size of which is larger than the diameter of the head of the fixing screw 16a is provided between the wiring patterns 40a and 40b of the cover FPC 40 in the portion thereof which corresponds to an area surrounding the screw inserting hole 31 of the mounting portion 30a.

An FPC 50 which is bonded to the slide chassis 2 (hereinafter referred to as the chassis FPC 50) is connected at its one end (not shown) to a circuit of the VTR and has wiring patterns 50a and 50b. The other ends of the respective wiring patterns 50a and 50b are formed as exposed portions (electrical conducting portions) 50a' and 50b' which are disposed at positions corresponding to the projections 32a and 32b of the abutment face 32 of the reel mount cover 30, respectively.

In the above-described arrangement and construction, as shown in FIG. 2, if the mounting portion 30a of the reel mount cover 30 is fastened to a screw engagement hole 2a of the slide chassis 2 by means of the fixing screw 16a, the abutment face 32 of the mounting portion 30a is pressed against the slide chassis 2 and the chassis FPC at the abutment start portion 32c and the projections 32a and 32b, respectively. Thus, the reel mount cover 30 is fixed to the slide chassis 2, and the wiring-pattern exposed portions 40a' and 40b' of the cover FPC 40 are electrically connected to the wiring-pattern exposed portions 50a' and 50b' of the chassis FPC 50, respectively.

As described above, at the same time that the reel mount cover 30 is secured to the slide chassis 2, the wiring of the cover FPC 40 and that of the chassis FPC 50 are connected to each other. Accordingly, it is not necessary to solder the wirings during the process of securing the reel mount cover 30 to the slide chassis 2, so that the automation of the securing process is facilitated.

The fixation of the reel mount cover 30 to the slide chassis 2 is realized by the fastening of the abutment face 32 in the area 33 which is defined by the abutment start portion 32c and the projections 32a and 32b. Accordingly, since the abutment start portion 32c and the projections 32a and 32b are brought into intimate contact with the slide chassis 2, the contact between the wirings can be made stable, and the height ("h" in FIG. 2) of the reel mount cover 30, i.e., the height of the light emitting element 17, can be accurately set.

Figure 2A:
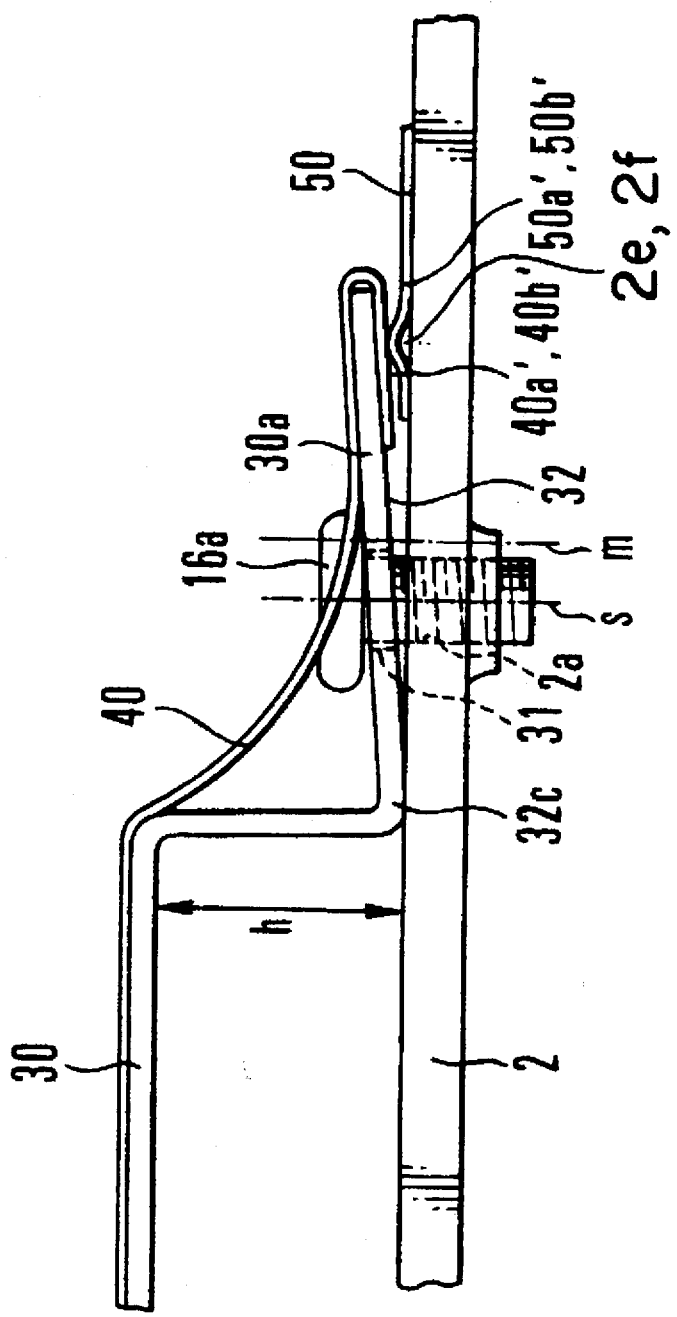

Incidentally, in the structure of FIG. 2, the chassis FPC 50 may also be extended to the abutment start portion 32c of the abutment face 32 of the reel mount cover 30 and clamped between the abutment start portion 32c and the slide chassis 2. In addition, although the projections 32a and 32b are provided on the abutment face 32 of the reel mount cover 30, such projections may be provided on the slide chassis 2 as shown by projects 2e and 2f of FIG 2A. In addition, it is possible to achieve a substantially equivalent effect by forming electrical conducting projections at the respective exposed portions 40a' and 40b' of the cover FPC 40 or the respective exposed portions 50a' and 50b' of the chassis FPC 50.

Although the preferred embodiment of the present invention has been described, the present invention is not limited to only the above-described embodiment, and various useful modifications and applications are possible on the basis of the technical concept of the present invention. For example, although in the embodiment the wirings are connected to each other at the positions of the projections of the abutment face of the mounting portion of the reel mount cover, in the present invention, the wirings may be connected to each other by contact portions between the surfaces of abutment between the reel mount cover and the chassis. Accordingly, the contact portions need not necessarily have a special shape, and the wirings may also be connected to each other by flat surfaces. The present invention also encompasses an arrangement which brings the projections of the abutment face into abutment with the chassis via a member such as a circuit board. In addition, although FPCs are employed for wiring in the embodiment, other wiring materials, such as wire, may also be used. In addition, although a light emitting element is provided on the reel mount cover as the tape end detecting element provided, a light receiving element or various other kinds of elements may be employed. Incidentally, the present invention can be usefully applied to any kind of arrangement in which a reel mount cover for covering a reel mount driving part can be secured to a chassis, even if a slide chassis such as that of the embodiment is not incorporated.

As is apparent from the foregoing description, according to the present embodiment, the abutment start portion and the contact portions of the abutment face are brought into intimate contact with the chassis by fastening the abutment face in the area defined by the contact portions and the abutment start portion during the process of fixing the reel mount cover to the chassis. Accordingly, the wirings can be electrically stably connected to each other at the contact portions, and the height of the reel mount cover, i.e., the height of the tape end detecting element, can be accurately set, so that it is possible to provide a structure which is suited to automatic assembly and has high operational reliability.

What is claimed is:

1. A recording and/or reproducing apparatus employing a cassette which contains a tape wound around a pair of reels, comprising:

(a) a chassis;

(b) a pair of reel mounts provided on said chassis, said pair of reel mounts respectively having engagement portions which engage with the pair of reels;

(c) a cover disposed between said pair of reel mounts in such a manner as to expose at least said engagement portions of said pair of reel mounts, said cover having at least one abutment portion at which to fix said cover to said chassis;

(d) a sensor for detecting an end of the tape, at least part of said sensor being provided on said cover;

(e) a first wiring portion provided on said chassis in such a manner that one end of said first wiring portion is disposed at a position opposite to said abutment portion of said cover; and (f) a second wiring portion provided on said cover in such a manner that one end of said second wiring portion is connected to a portion of said sensor and another end of said second wiring portion is disposed between said abutment portion and said one end of said first wiring portion, wherein a projection for connecting said one end of said first wiring portion to said other end of said second wiring portion is provided between surfaces of abutment between said chassis and said abutment portion of said cover, and a fixing member for fixing said abutment portion to said chassis is disposed between said projection and an abutment start portion of said abutment portion.

2. A recording and/or reproducing apparatus according to claim 1, wherein said abutment portion is formed in an L-like shape in cross section and is integrally joined to a top face portion of said cover.

3. A recording and/or reproducing apparatus according to claim 2, wherein said abutment start portion of said abutment portion is a corner portion of said L-like shape.

4. A recording and/or reproducing apparatus according to claim 1, wherein said projection includes two projections, and said abutment portion is fixed to said chassis in an area defined by said two projections and said abutment start portion of said abutment portion.

5. A recording and/or reproducing apparatus according to claim 4, wherein said abutment portion is formed in an L-like shape in cross section and is integrally joined to a top face portion of said cover.

6. A recording and/or reproducing apparatus according to claim 5, wherein said abutment start portion of said abutment portion is a corner portion of said L-like shape.

7. A recording and/or reproducing apparatus according to claim 1, wherein said fixing member is disposed at a position which is offset toward said abutment start portion from a position of half a distance between said projection and said abutment start portion of said abutment portion.

8. A recording and/or reproducing apparatus according to claim 1, wherein said projection is provided at said abutment portion.

9. A recording and/or reproducing apparatus according to claim 1, wherein said projection is provided at said chassis.

10. A recording and/or reproducing apparatus according to claim 1, wherein said portion of said sensor to which said second wiring portion is connected is a light emitting element.

11. A cover disposed between a pair of reel mounts provided on a chassis of a recording and/or reproducing apparatus, comprising:

(a) a top face plate;

(b) at least one fixing portion integrally joined to said top face plate and formed in an L-like shape in cross section;

(c) a projection provided on a face of said fixing portion which face comes into abutment with said chassis; and (d) a hole into which to insert a fixing member for fixing said fixing portion to said chassis, said hole being formed between said projection and a corner portion of said fixing portion formed in the L-like shape in cross section.

12. A cover according to claim 11, wherein said projection includes two projections, and said hole is formed in an area defined by said two projections and said corner portion of said fixing portion.

13. A cover according to claim 11, wherein said hole is disposed at a position which is offset toward said corner portion from a position of half a distance between said projection and said corner portion of said fixing portion.

14. A recording and/or reproducing apparatus employing a cassette which contains a tape wound around a pair of reels, comprising:

(a) a first chassis;

(b) a second chassis relatively movable with respect to said first chassis;

(c) a pair of reel mounts provided on said second chassis, said pair of reel mounts respectively having engagement portions which engage with the pair of reels;

(d) a cover disposed between said pair of reel mounts in such a manner as to expose at least said engagement portions of said pair of reel mounts, said cover having at least one abutment portion at which to fix said cover to said second chassis;

(e) a sensor for detecting an end of the tape, at least part of said sensor being provided on said cover;

(f) a first wiring portion provided on said second chassis in such a manner that one end of said first wiring portion is disposed at a position opposite to said abutment portion of said cover; and (g) a second wiring portion provided on said cover in such a manner that one end of said second wiring portion is connected to a portion of said sensor and another end of said second wiring portion is disposed between said abutment portion and said one end of said first wiring portion, wherein a projection for connecting said one end of said first wiring portion to said other end of said second wiring portion is provided between surfaces of abutment between said second chassis and said abutment portion of said cover, and a fixing member for fixing said abutment portion to said second chassis is disposed between said projection and an abutment start portion of said abutment portion.

15. A recording and/or reproducing apparatus according to claim 14, wherein said abutment portion is formed in an L-like shape in cross section and is integrally joined to a top face portion of said cover.

16. A recording and/or reproducing apparatus according to claim 15, wherein said abutment start portion of said abutment portion is a corner portion of said L-like shape.

17. A recording and/or reproducing apparatus according to claim 14, wherein said projection includes two projections, and said abutment portion is fixed to said second chassis in an area defined by said two projections and said abutment start portion of said abutment portion.

18. A recording and/or reproducing apparatus according to claim 17, wherein said abutment portion is formed in an L-like shape in cross section and is integrally joined to a top face portion of said cover.

19. A recording and/or reproducing apparatus according to claim 18, wherein said abutment start portion of said abutment portion is a corner portion of said L-like shape.

20. A recording and/or reproducing apparatus according to claim 14, wherein said fixing member is disposed at a position which is offset toward said abutment start portion from a position of half a distance between said projection and said abutment start portion of said abutment portion.

21. A recording and/or reproducing apparatus according to claim 14, wherein said projection is provided at said abutment portion.

22. A recording and/or reproducing apparatus according to claim 14, wherein said projection is provided at said second chassis.

23. A recording and/or reproducing apparatus according to claim 14, wherein said portion of said sensor to which said second wiring portion is connected is a light emitting element.

* * * * *

UNITED STATES PATENT AND TRADEMARK OFFICE
CERTIFICATE OF CORRECTION

PATENT NO. : 5,692,696
DATED : December 2, 1997
INVENTOR(S) : Kobayashi, Junji

It is certified that error appears in the above-identified patent and that said Letters Patent is hereby corrected as shown below:

Col. 5, line 11, after "FPC" insert -- 50 --.

Col. 5, line 42, delete "projects" and insert -- projections --.

Signed and Sealed this

Second Day of June, 1998

Attest:

BRUCE LEHMAN

Attesting Officer

Commissioner of Patents and Trademarks